(12) United States Patent
Chiu

(10) Patent No.: US 6,647,402 B1
(45) Date of Patent: Nov. 11, 2003

(54) PROCESS FOR GENERATING A SERIAL NUMBER FROM RANDOM NUMBERS

(75) Inventor: Chui-Kuei Chiu, Hsinchu Hsien (TW)

(73) Assignee: Umax Data Systems, Inc., Hsinchu (TW)

( * ) Notice: Subject to any disclaimer, the term of this patent is extended or adjusted under 35 U.S.C. 154(b) by 496 days.

(21) Appl. No.: 09/655,151

(22) Filed: Sep. 5, 2000

(51) Int. Cl.$^7$ .................................. G06F 1/02
(52) U.S. Cl. ................. 708/250; 708/254; 710/107
(58) Field of Search ............... 708/250, 254; 710/107

(56) References Cited

U.S. PATENT DOCUMENTS 5,068,894 A * 11/1991 Hoppe ........................ 713/172
5,892,929 A * 4/1999 Welker ........................ 710/107
6,298,360 B1 * 10/2001 Muller ........................ 708/250

* cited by examiner

Primary Examiner—David H. Malzahn
(74) Attorney, Agent, or Firm—J.C. Patents

(57) ABSTRACT

A process for generating a serial number from a random number is suitable for being used on a device that uses serial number in a bus. First, this process generates a serial number for use from a random number according to a seed number, and then it checks if this generated serial number is repeated in the bus. When this generated serial number is the same as the serial number corresponding to any other devices that are of the same kind as the above mentioned device in the bus, a new serial number for use will be generated.

10 Claims, 2 Drawing Sheets

PROCESS FOR GENERATING A SERIAL NUMBER FROM RANDOM NUMBERS

DESCRIPTION OF THE INVENTION

FIELD OF THE INVENTION

The present invention relates to a process for generating serial number, and particularly to a process for generating serial number from random number.

BACKGROUND OF THE INVENTION

In USB (Universal-Serial Bus) or IEEE 1394 Bus, every device will be given one and only serial number or ID. Generally speaking, the processes for generating serial number at present can be divided into two kinds. Wherein one kind of the processes for generating serial number is to use a fixed serial number on devices of the same kind. Although this process is simple and convenient, the devices of the same kind cannot be connected to one and the same USB or IEEE 1394 Bus and be used normally.

The other commonly known process for generating serial number is to store the serial number of devices in ROM, EPROM, EEPROM or flash memory, in order to make the serial number one and only. However, this process will cause the increase of the cost for programming the serial number and the increase of the expenses for memory circuit components in the process of manufacturing the devices. Apart from this, it is necessary to have control to prevent the serial number from repetition in the process of manufacturing, and in order to have the function of control, a related control circuit must be provided accordingly.

In such a situation, the present invention provides a process for generating serial number from random number. The process is suitable for being used on devices that use a serial number in a bus. This process first generates the serial number for use from random number based on a seed number, it then checks whether the serial number for use is repeated in the bus. If the generated serial number for use repeats the serial number corresponding to any other devices of the same kind in the bus, a new serial number for use is generated.

Among these numbers, the seed number can be any of the serial number corresponding to any of the devices of the same kind in the bus. The serial number for use is obtained from the combination in a random way of the serial numbers corresponding to these devices of the same kind.

Apart from this, when the device is a scanner, the seed number can be obtained by the variability of the increase of the tube's brightness after the device is started, the brightness of the reflected light of the correcting board, the random noise of the Charge Couple Device (CCD), or the distance between the edge of the correcting board and the home position, or by other ways. If the serial number for use includes several digits, any one of the digits can be generated from the seed number obtained by any one of the ways for obtaining seed numbers.

To sum up, the present invention is to generate a needed serial number for use from random number. In most devices nowadays, a Central Processing Unit (CPU) is installed, therefor it will not be a problem to generate a random number. The invention can save time and the expense of related components, and can at the same time avoid the interference of the same serial numbers; thereby devices of the same kind can be installed on the same bus.

In order to make the above description and other objects, characteristics, and advantages of the invention clearer and easier to understand, A detailed description will be provided with preferred embodiments and with reference to the accompanying drawings as follows:

PREFERRED EMBODIMENT OF THE INVENTION

Figure 1:
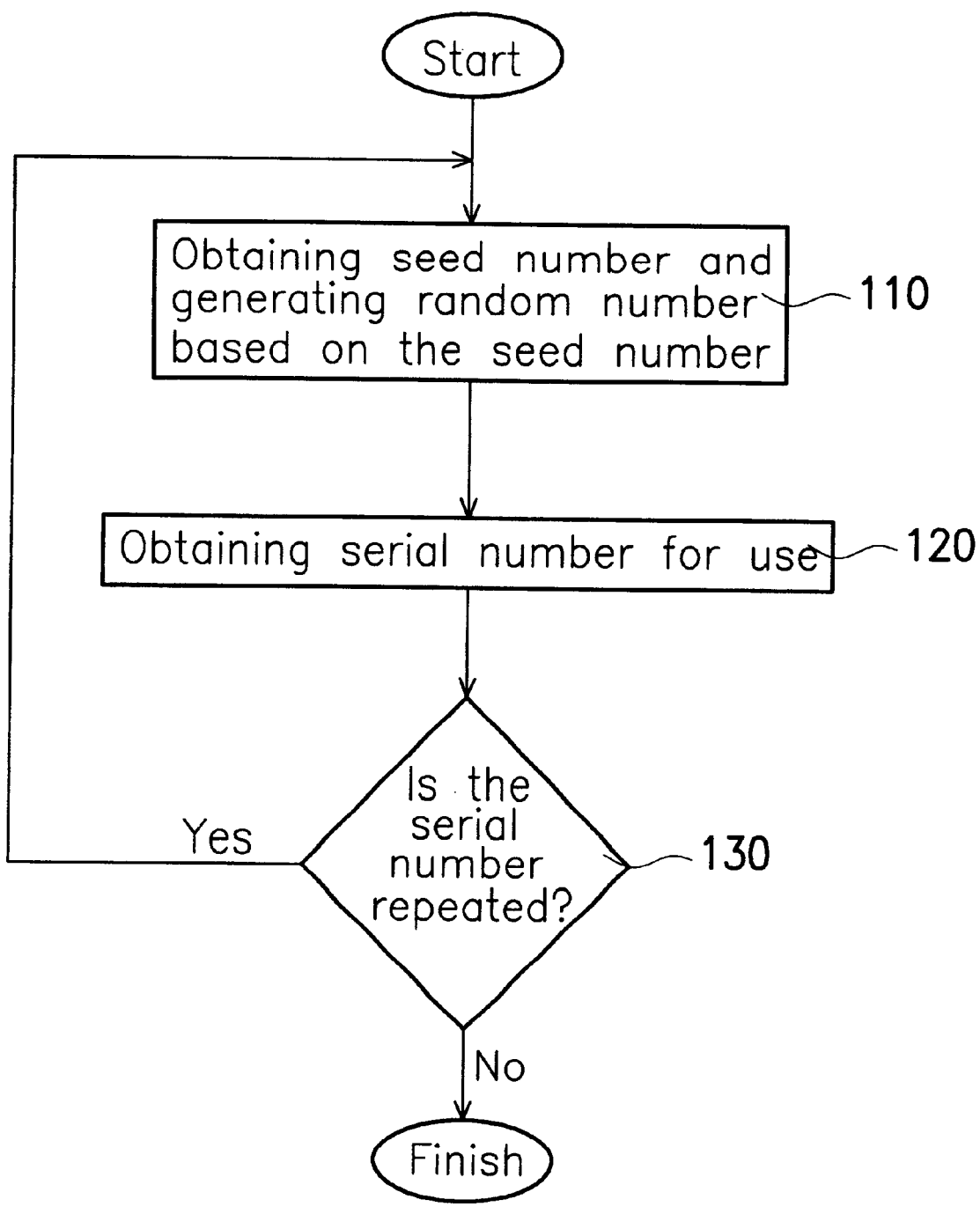
FIG. 1 shows a step flow chart of a preferred embodiment according to the present invention.

FIG. 1 shows a step flow chart of a preferred embodiment according to the invention. First in Step 110, the device that uses the process of the invention must obtain a seed number, and generate random number based on the seed number. Here the seed numbers that can be used may vary with devices. The better way would be to choose device that can obtain seed number with the least need of extra devices. For example, when this device is a scanner, the way to obtain seed number can be by the variability of the increase of the tube's brightness after the device is started, the brightness of the reflected light of the correcting board, the random noise of the Charge Couple Device, or by the distance between the edge of the correcting board and the home position.

Following Step 110, Step 120 is to generate a serial number from a combination of the random number. In this step, the most typical way is to take directly the random number obtained from Step 110 as the serial number for use. After this, Step 130 determines if the serial number for use obtained from Step 120 repeats the serial number of the other devices of the same kind in the bus. If it repeats, the device goes back to Step 110 to obtain a new seed number and then to obtain a new random number and a new serial number. Of course, it is also possible to renew only the random number without the need to obtain a new seed number.

Apart from this, when the serial number for use includes several digits, Step 110 can be repeated for several times, and a random number is obtained in the process of each repetition. Then the random numbers obtained from every time are combined together in Step 120. In another word, several random numbers can be taken as digits that form the serial numbers in use.

Figure 2:
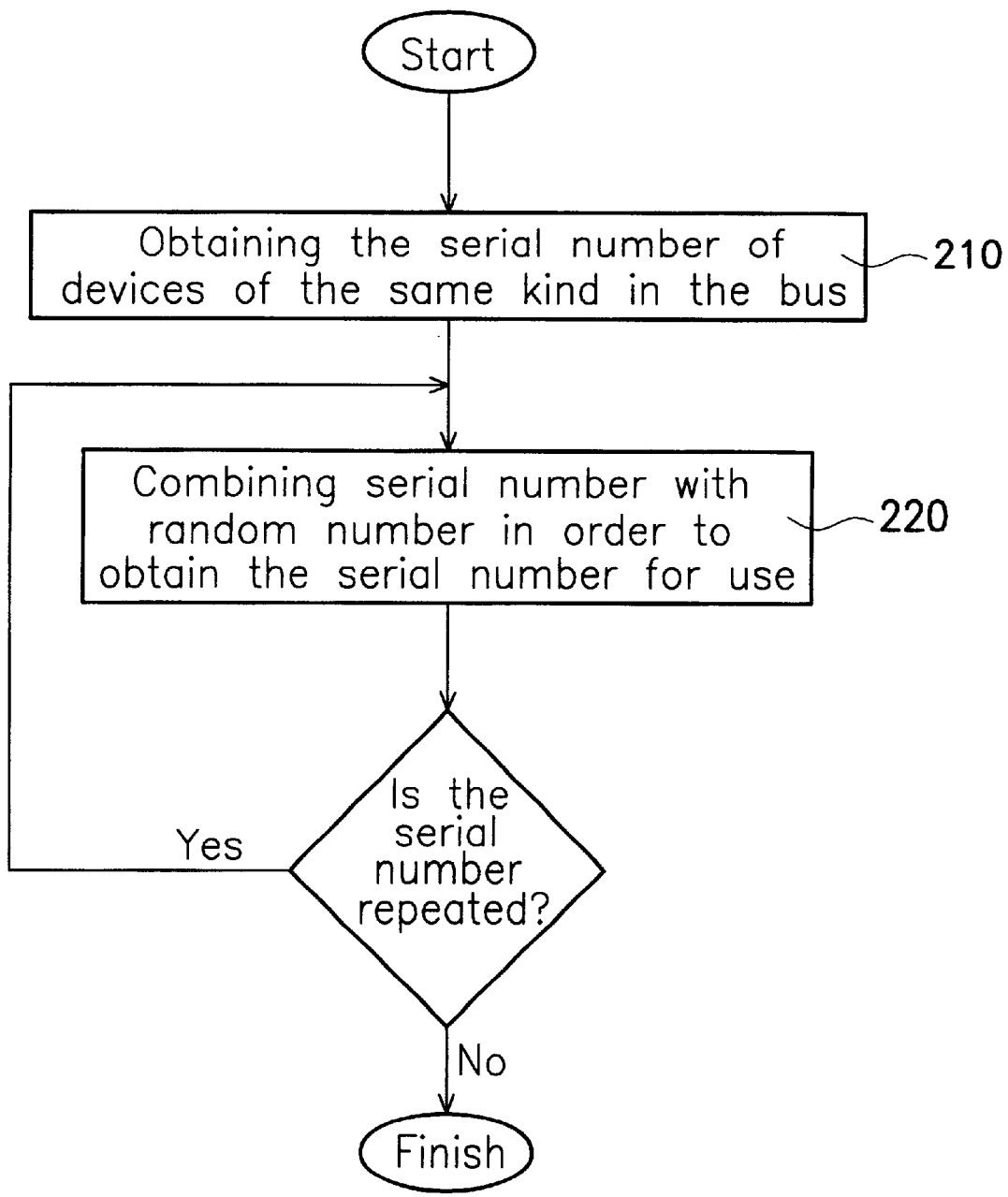
FIG. 2 shows another step flow chart of a preferred embodiment according to the present invention.

FIG. 2 shows flow chart of another preferred embodiment according to the invention. In this embodiment, the device that uses the process of the present invention first in Step 210 obtains serial numbers from the other devices of the same kind in the bus, then in Step 220 combines random numbers with these serial numbers, and obtain the serial number of the device according to the result of the combination. Finally, in Step 230 it checks the serial number for use in order to make sure the serial number for use does not repeats the serial numbers of the other devices of the same kind. When the serial number for use repeats the serial numbers of the other devices of the same kind, the device goes back to Step 220 to combine random number and serial numbers again to obtain another serial number for use.

It must be noted that while this invention can be used in devices with Central Processing Unit, it is not limited to the scanner mentioned herein. In addition, the processes disclosed in the two examples of embodiment for generating serial number from random number can be used together. They do not have to be used separately.

To sum up, the advantages of the present invention are as follows: the invention saves working time and the cost of the relevant component, and it easily avoids the disturbance caused by the same serial numbers.

While the invention is disclosed above with the preferred examples of embodiment, the invention is not limited by the preferred examples of embodiment. Anyone who is familiar with the art can make various modifications thereto, and it is intended that the appended claims cover all such modifications as fall within the true spirit and scope of the invention.

What is claimed is:

1. A process for generating a serial number from a random number, which is suitable for being used on a device that uses the serial number in a bus, the process comprising:

generating the serial number for use from a random number based on a seed number, wherein the seed number is taken from an actual operation quantity carried by the device;

checking if the generated serial number is repeated in the bus; and when the generated serial number is the same as a serial number corresponding to any other device of the bus, regenerating another serial number for the device.

2. A process for generating a serial number from a random number according to claim 1, wherein the seed number is a serial number corresponding to any of other devices in the bus.

3. A process for generating a serial number from a random number according to claim 2, wherein the generated serial number for use is formed by the combination of the serial number corresponding to any of the other devices in the bus.

4. A process for generating a serial number from a random number according to claim 3, wherein the said serial number is formed by permuting in a random way the said serial number corresponding to any of the other devices in the bus.

5. A process for generating a serial number from a random number, which is suitable for being used on a device that uses the serial number in a bus, the process comprising:

generating the serial number for use from a random number based on a seed number;

checking if the generated serial number is repeated in the bus; and when the generated serial number is the same as a serial number corresponding to any other device of the bus, regenerating another serial number for the device, wherein the device is a scanner, and the seed number is taken from a quantity selected from the group consisting of a variability of increasing of a tube's brightness after the scanner is started, a brightness of a reflected light of a correcting board, a random noise of a charge couple device, and a distance between an edge of the correcting board and a home position of the correcting board.

6. A process for generating a serial number from a random number according to claim 5, wherein said generated serial number for use comprises a plurality of digit bits.

7. A process for generating a serial number from a random number according to claim 6, wherein each said digit bit of the generated serial number is generated from the seed number.

8. A process for generating a serial number from a random number according to claim 5, wherein the seed number is a serial number corresponding to any of other devices in the bus.

9. A process for generating a serial number from a random number according to claim 8, wherein the generated serial number for use is formed by the combination of the serial number corresponding to any of the other devices in the bus.

10. A process for generating a serial number from a random number according to claim 9, wherein the said serial number is formed by permuting in a random way the said serial number corresponding to any of the other devices in the bus.

* * * * *